(12) United States Patent
Yu et al.

(10) Patent No.: US 11,853,130 B2
(45) Date of Patent: Dec. 26, 2023

(54) ELECTRONIC DEVICE AND LINKED HINGE MECHANISM THEREOF

(71) Applicant: Wistron Corp., New Taipei (TW)

(72) Inventors: Kuan-Te Yu, New Taipei (TW);
Chia-Lian Yen, New Taipei (TW);
Po-Han Huang, New Taipei (TW);
Kevin Jang, New Taipei (TW);
Chih-Sheng Chou, New Taipei (TW)

(73) Assignee: WISTRON CORP., New Taipei (TW)

( * ) Notice: Subject to any disclaimer, the term of this patent is extended or adjusted under 35 U.S.C. 154(b) by 153 days.

(21) Appl. No.: 17/194,049

(22) Filed: Mar. 5, 2021

(65) Prior Publication Data

US 2022/0147112 A1     May 12, 2022

(30) Foreign Application Priority Data

Nov. 10, 2020   (TW) .................................. 109139111

(51) Int. Cl.
| | | |
|---|---|---|
| *E05D 11/08* | (2006.01) | |
| *G06F 1/16* | (2006.01) | |
| *F16C 11/04* | (2006.01) | |
| *E05D 3/12* | (2006.01) | |
| *E05D 7/00* | (2006.01) | |

(52) U.S. Cl.
CPC ............ *G06F 1/1681* (2013.01); *F16C 11/04* (2013.01); *E05D 3/122* (2013.01); *E05D 7/00* (2013.01); *E05Y 2900/606* (2013.01); *G06F 1/1616* (2013.01)

(58) Field of Classification Search
CPC ...... F16C 11/04; E05Y 2900/606; E05D 7/00; E05D 3/122; G06F 1/1681
See application file for complete search history.

(56) References Cited

U.S. PATENT DOCUMENTS

| | | | | |
|---|---|---|---|---|
| 6,922,872 | B2* | 8/2005 | Gruber | E05D 5/062 16/386 |
| 9,759,242 | B2* | 9/2017 | Hsu | F16M 13/005 |
| 9,823,706 | B2* | 11/2017 | Chen | E05D 3/02 |
| 9,841,789 | B2* | 12/2017 | Lin | G06F 1/1615 |
| 9,964,998 | B2* | 5/2018 | Park | E05D 11/10 |
| 10,015,897 | B1* | 7/2018 | Hong | H04M 1/0268 |
| 10,037,057 | B2* | 7/2018 | Schafer | H04M 1/0216 |
| 10,066,429 | B2* | 9/2018 | Park | E05D 1/04 |
| 10,082,838 | B1* | 9/2018 | Hong | E05D 11/0081 |
| 10,082,839 | B1* | 9/2018 | Turchin | G09F 9/301 |
| 10,120,421 | B1* | 11/2018 | Hong | G06F 1/1681 |
| 10,168,746 | B2* | 1/2019 | Senatori | G06F 1/1616 |
| 10,175,730 | B2* | 1/2019 | Lin | G06F 1/1681 |

(Continued)

FOREIGN PATENT DOCUMENTS

| | | |
|---|---|---|
| CN | 209281287 U | 8/2019 |
| DE | 102021103876 A1 * | 8/2022 |
| TW | M498451 U | 4/2015 |

*Primary Examiner* — Jason W San

(57) ABSTRACT

A linked hinge mechanism includes a first member, a second member, a hinge unit and a passive unit. The hinge unit is connected to the first member and the second member, wherein the first member is adapted to be rotated relative to the second member via the hinge unit. The passive unit is adapted to be moved by the movement of the hinge unit, wherein the passive unit is adapted to be rotated by the movement of the hinge unit in only a portion of the whole rotation range of the hinge unit.

19 Claims, 18 Drawing Sheets

(56) References Cited

U.S. PATENT DOCUMENTS

| | | | | |
|---|---|---|---|---|
| 10,309,137 B2* | 6/2019 | Wu | | F16C 11/04 |
| 10,358,853 B2* | 7/2019 | Tomky | | F16M 11/38 |
| 10,480,227 B1* | 11/2019 | Chen | | E05D 3/122 |
| 10,545,540 B2* | 1/2020 | Wendt | | G06F 1/1681 |
| 10,606,322 B2* | 3/2020 | Siddiqui | | G06F 1/1681 |
| 10,656,685 B2* | 5/2020 | Cheng | | G06F 1/1616 |
| 10,845,850 B1* | 11/2020 | Kang | | H04M 1/0268 |
| 10,963,020 B2* | 3/2021 | Kim | | G06F 1/1616 |
| 11,009,061 B2* | 5/2021 | Chang | | E05D 11/06 |
| 11,054,868 B2* | 7/2021 | Lin | | G06F 1/1616 |
| 11,287,853 B2* | 3/2022 | Yao | | G06F 1/1681 |
| 11,301,006 B2* | 4/2022 | Hsu | | G06F 1/1641 |
| 11,320,871 B2* | 5/2022 | Lin | | E05D 11/1014 |
| 11,334,122 B2* | 5/2022 | Hsu | | F16C 11/04 |
| 11,447,992 B2* | 9/2022 | Wang | | G06F 1/1681 |
| 11,493,966 B2* | 11/2022 | Kim | | G06F 1/166 |
| 2004/0203994 A1* | 10/2004 | Won | | G06F 1/1637 455/522 |
| 2009/0320243 A1* | 12/2009 | Wang | | G06F 1/1616 16/303 |
| 2010/0103601 A1* | 4/2010 | Wang | | E05F 1/1215 16/362 |
| 2011/0232035 A1* | 9/2011 | Huang | | G06F 1/1681 16/386 |
| 2012/0212924 A1* | 8/2012 | Nakajima | | G06F 1/1681 361/807 |
| 2016/0083989 A1* | 3/2016 | Kuo | | E05D 1/04 16/355 |
| 2017/0003719 A1* | 1/2017 | Siddiqui | | G06F 1/166 |
| 2017/0068284 A1* | 3/2017 | Park | | G06F 1/1679 |
| 2017/0208703 A1* | 7/2017 | Lin | | H05K 7/16 |
| 2017/0269637 A1* | 9/2017 | Lin | | F16C 11/04 |
| 2018/0049329 A1* | 2/2018 | Seo | | E05D 3/18 |
| 2018/0129253 A1* | 5/2018 | Siddiqui | | G06F 1/1681 |
| 2019/0011957 A1* | 1/2019 | Wendt | | E05D 11/082 |
| 2019/0317552 A1* | 10/2019 | Cheng | | G06F 1/1681 |
| 2019/0317562 A1* | 10/2019 | Cheng | | E05D 7/00 |
| 2022/0269316 A1* | 8/2022 | Onda | | G06F 1/1681 |
| 2022/0321683 A1* | 10/2022 | Luo | | G06F 1/1683 |

* cited by examiner

ELECTRONIC DEVICE AND LINKED HINGE MECHANISM THEREOF

CROSS REFERENCE TO RELATED APPLICATIONS

This Application claims priority of Taiwan Patent Application No. 109139111, filed on Nov. 10, 2020, the entirety of which is incorporated by reference herein.

BACKGROUND OF THE INVENTION

Field of the Invention

The present invention relates to a linked hinge mechanism, and in particular to a linked hinge mechanism utilized in an electronic device.

Description of the Related Art

The hinge mechanism of a conventional notebook computer is disposed between the cover and the device body. The cover pivots on the device body via the hinge mechanism. With the increasing complexity of the functions of the notebook, other members (such as the decoration shield, supporting posts) of the notebook should be moved with the movement of the hinge mechanism when the cover is rotated relative to the device body. However, restricted by limited space inside the notebook, the desired linked mechanism is difficult to design.

BRIEF SUMMARY OF THE INVENTION

Embodiments of the invention are provided to address the aforementioned difficulty.

In one embodiment, a linked hinge mechanism includes a first member, a second member, a hinge unit and a passive unit. The hinge unit is connected to the first member and the second member, wherein the first member is adapted to be rotated relative to the second member via the hinge unit. The passive unit is adapted to be moved by the movement of the hinge unit, wherein the passive unit is adapted to be rotated by the movement of the hinge unit in only a portion of the whole rotation range of the hinge unit.

In one embodiment, an electronic device includes a cover, a device body, a hinge unit and a passive unit. The hinge unit is connected to the cover and the device body, wherein the cover is adapted to be rotated relative to the device body via the hinge unit. The passive unit is adapted to be moved by the movement of the hinge unit, wherein the passive unit is adapted to be rotated by the movement of the hinge unit in only a portion of the whole rotation range of the hinge unit.

Utilizing the linked hinge mechanism of the embodiment of the invention, when the first member is rotated relative to the second member via the hinge unit, the passive unit is rotated by the movement of the hinge unit. When the first member is rotated from the second member orientation to the third member orientation relative to the second member, the passive unit is not rotated to provide the intermittent rotation effect.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1A:
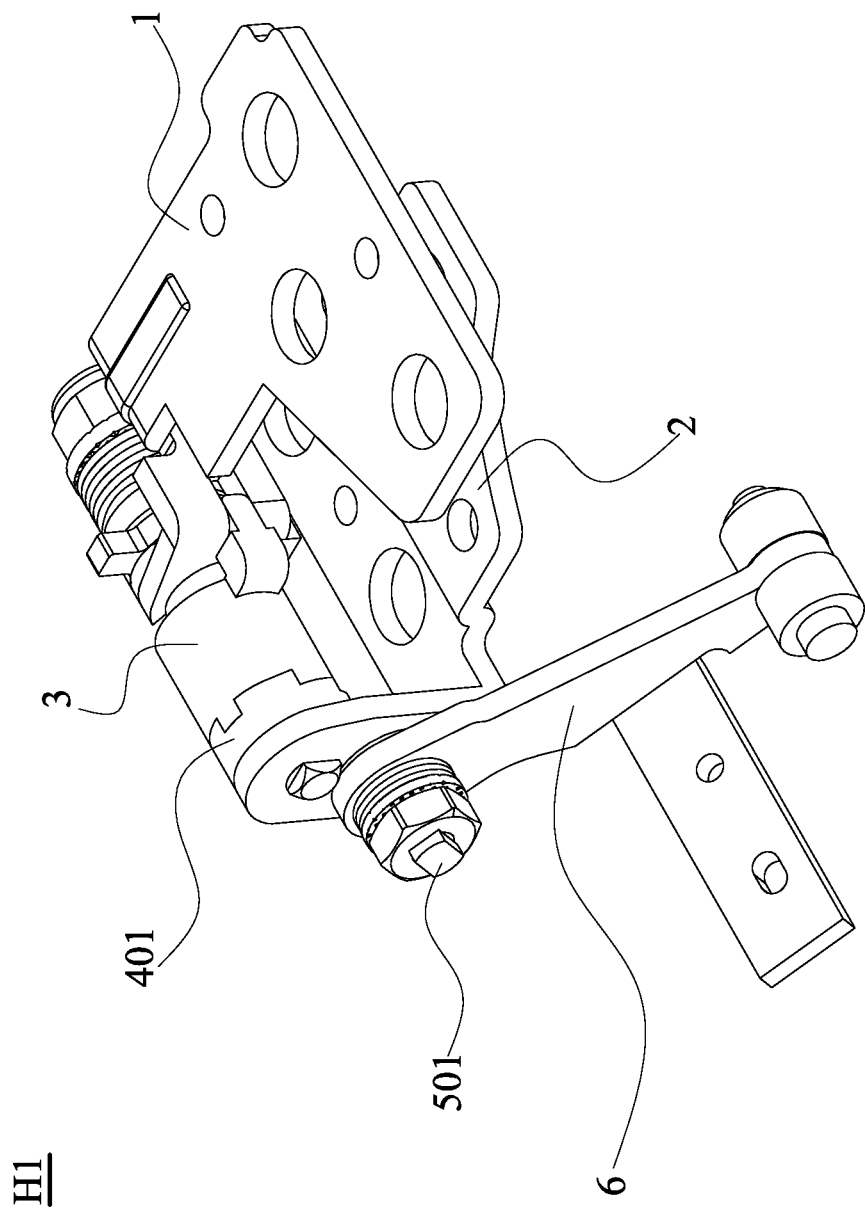
FIG. 1A is a perspective view of a linked hinge mechanism of a first embodiment of the invention, wherein a first member is in a first member orientation.
Figure 1B:
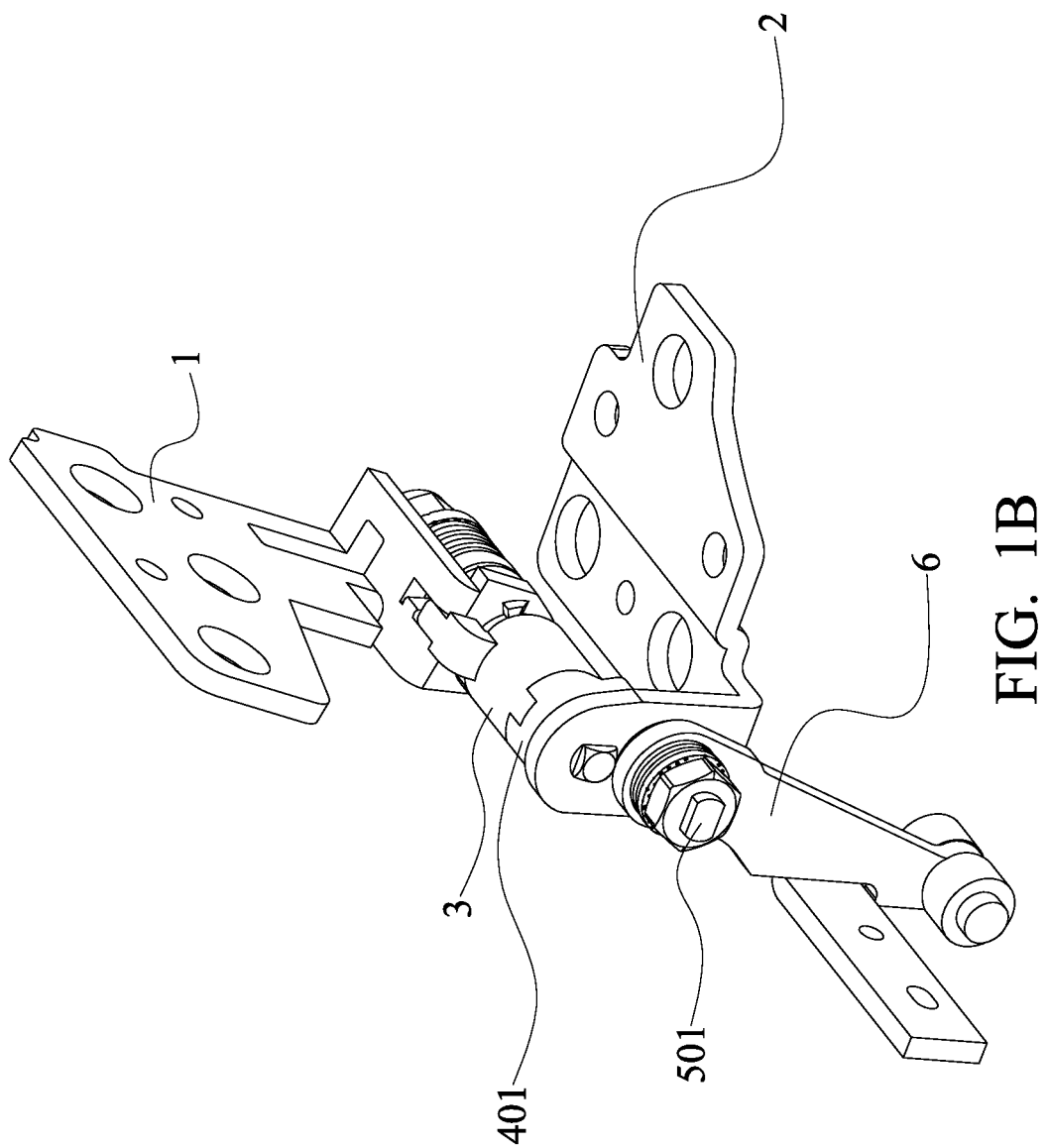
FIG. 1B is a perspective view of the linked hinge mechanism of the first embodiment of the invention, wherein the first member is in a second member orientation.
Figure 1C:
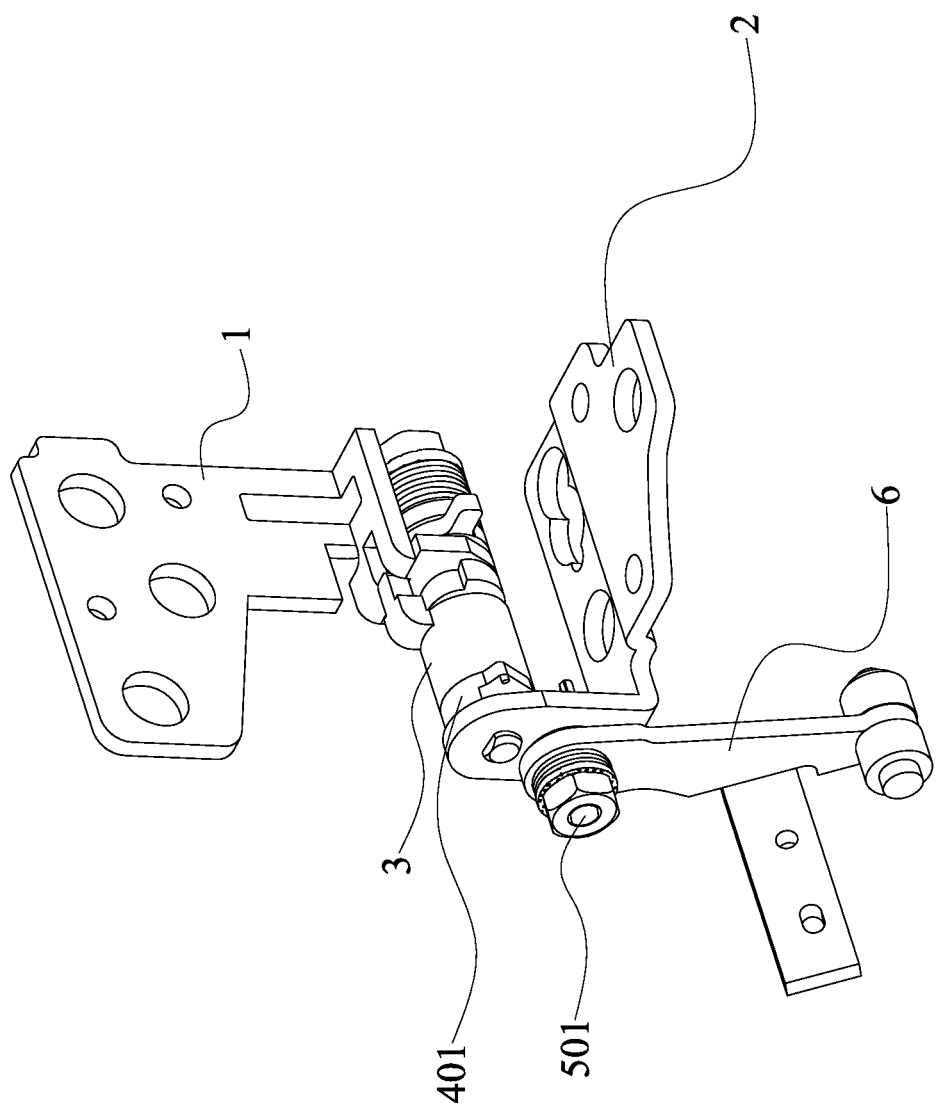
FIG. 1C is a perspective view of the linked hinge mechanism of the first embodiment of the invention, wherein the first member is in a third member orientation.
Figure 2A:
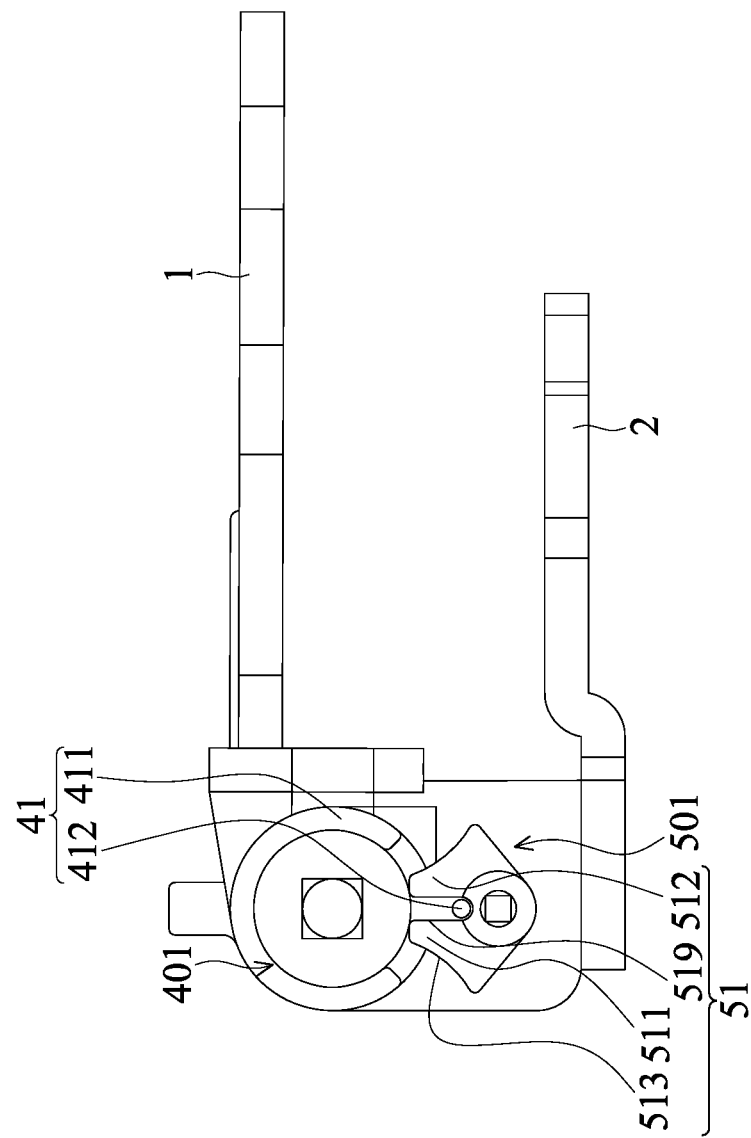
FIG. 2A is a side view of the linked hinge mechanism of the first embodiment of the invention, wherein the first member is in the first member orientation.
Figure 2B:
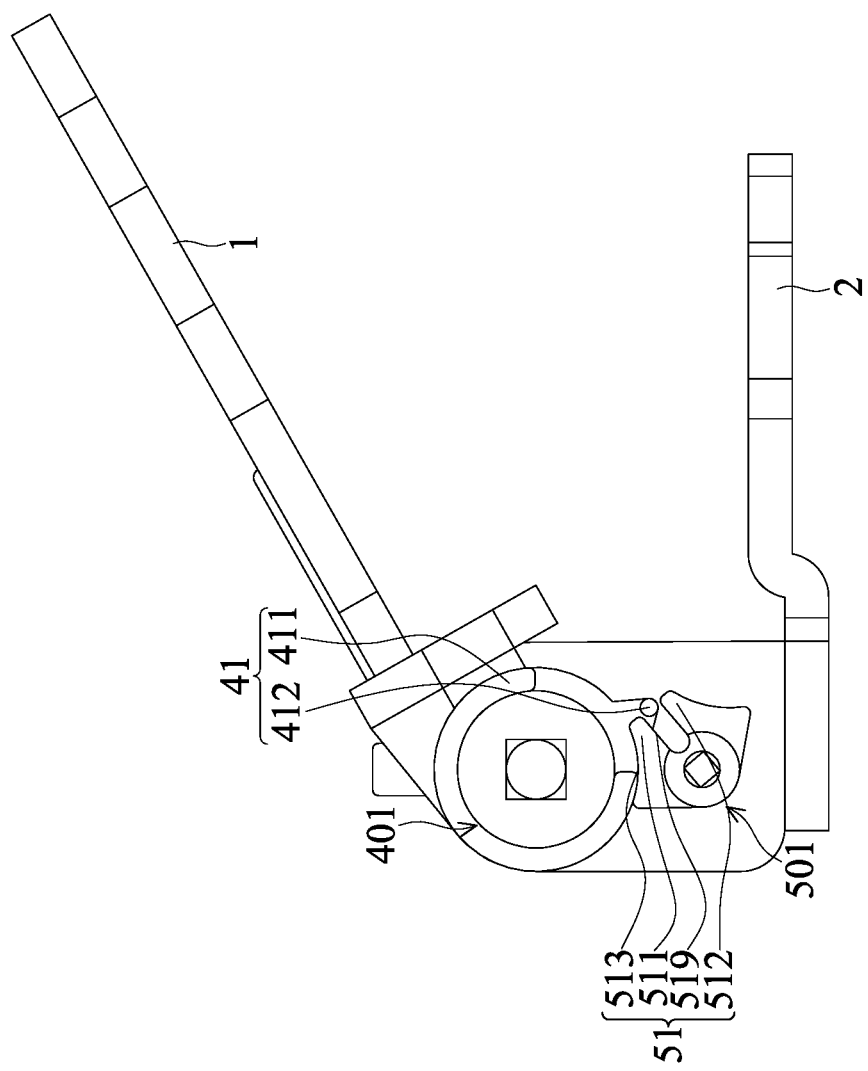
FIG. 2B is a side view of the linked hinge mechanism of the first embodiment of the invention, wherein the first member is in the second member orientation.
Figure 2C:
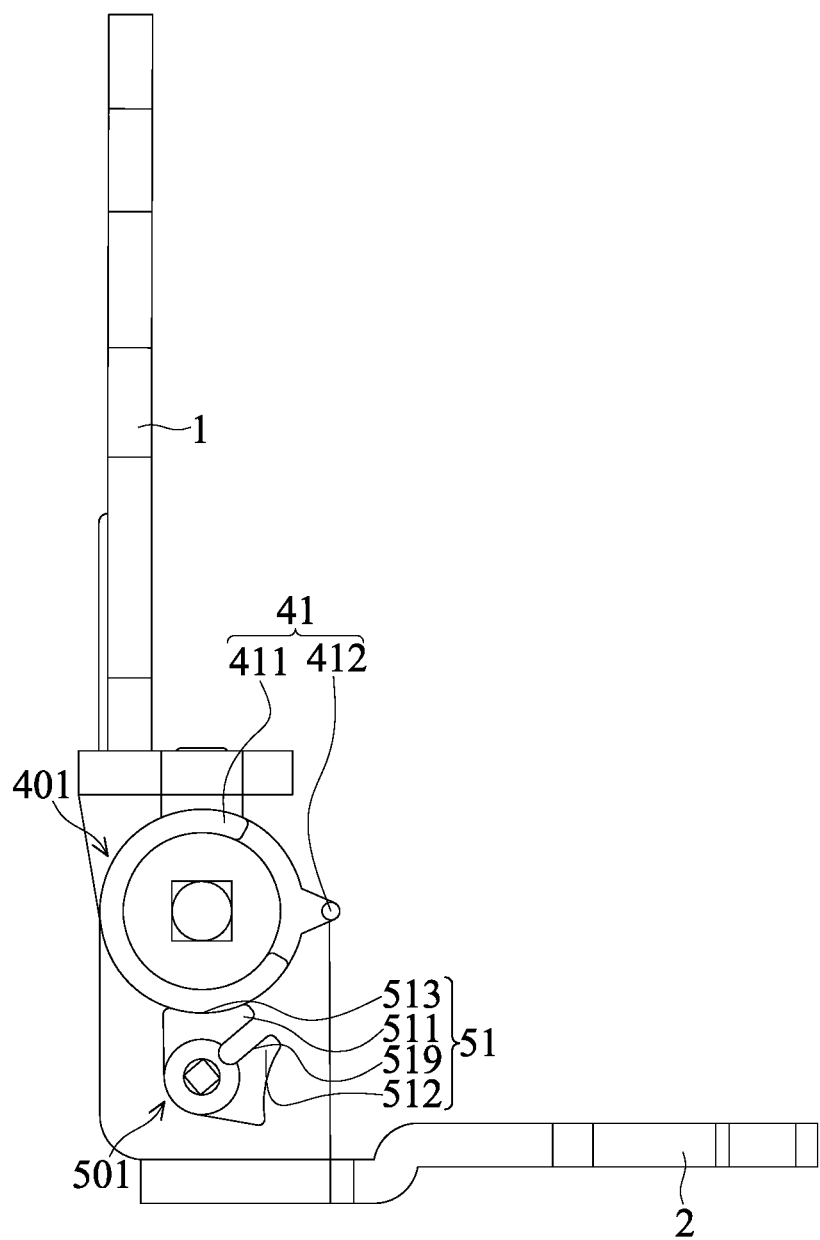
FIG. 2C is a side view of the linked hinge mechanism of the first embodiment of the invention, wherein the first member is in the third member orientation.

FIG. 1A is a perspective view of a linked hinge mechanism of a first embodiment of the invention, wherein a first member is in a first member orientation. FIG. 1B is a perspective view of the linked hinge mechanism of the first embodiment of the invention, wherein the first member is in a second member orientation. FIG. 1C is a perspective view of the linked hinge mechanism of the first embodiment of the invention, wherein the first member is in a third member orientation. FIG. 2A is a side view of the linked hinge mechanism of the first embodiment of the invention, wherein the first member is in the first member orientation. FIG. 2B is a side view of the linked hinge mechanism of the first embodiment of the invention, wherein the first member is in the second member orientation. FIG. 2C is a side view of the linked hinge mechanism of the first embodiment of the invention, wherein the first member is in the third member orientation. With reference to FIGS. 1A, 1B, 2A and 2B, the linked hinge mechanism H1 of the embodiment of the invention includes a first member 1, a second member 2, a hinge unit 3, a pushing unit 401 and a passive unit 501. The hinge unit 3 is connected to the first member 1 and the second member 2. The first member 1 is adapted to be rotated relative to the second member 2 via the hinge unit 3. The pushing unit 401 is connected to the hinge unit 3 and is adapted to be rotated with the hinge unit 3. The passive unit 501 is adapted to be rotated by the movement of the hinge unit 3 in only a portion of the whole rotation range of the hinge unit 3. The passive unit 501 is adapted to be connected to the pushing unit 401. When the first member 1 is rotated from a first member orientation (FIGS. 1A and 2A) to a second member orientation (FIGS. 1B and 2B) relative to the second member 2, the passive unit 501 is rotated by the movement of the pushing unit 401.

With reference to FIGS. 1B, 1C, 2B and 2C, in one embodiment, when the first member 1 is rotated from a second member orientation (FIGS. 1B and 2B) to a third member orientation (FIGS. 1C and 2C) relative to the second member 2, the linkage between the pushing unit 401 and the passive unit 501 is removed, and the passive unit 501 is not rotated.

With reference to FIGS. 2A, 2B and 2C, in one embodiment, the pushing unit 401 comprises a pushing member 41. The pushing member 41 comprises a rim 411 and a pushing post 412. The passive unit 501 comprises a passive member 51. The passive member 51 comprises a guiding slot 519 and a first curved surface 513. When the first member 1 is in the first member orientation (FIG. 2A) relative to the second member 2, the pushing post 412 is in the guiding slot 519. When the first member 1 is rotated from the first member orientation (FIG. 2A) to the second member orientation (FIG. 2B) relative to the second member 2, the pushing post 412 pushes the inner wall of the guiding slot 519 to rotate the passive member 51.

With reference to FIGS. 2A, 2B and 2C, in one embodiment, when the first member 1 is in the second member orientation (FIG. 2B) relative to the second member 2, the pushing post 412 is adapted to be separated from the guiding slot 519 and the rim 411 abuts the first curved surface 513. When the first member 1 is rotated from the second member orientation (FIG. 2B) to the third member orientation (FIG. 2C) relative to the second member 2, the rim 411 slides along the first curved surface 513, and the passive member 51 is not rotated.

With reference to FIGS. 2A, 2B and 2C, in one embodiment, the passive member 51 comprises a first claw 511 and a second claw 512. The guiding slot 519 is located between the first claw 511 and the second claw 512. The first curved surface 513 is formed on the first claw 511.

In this embodiment, the length of the second claw 512 is substantially the same with the length of the first claw 511.

With reference to FIGS. 1A, 1B and 1C, in one embodiment, the linked hinge mechanism further comprises a passive structure 6. The passive structure 6 is affixed to the passive unit 501. When the first member 1 is rotated from the first member orientation (FIG. 1A) to the second member orientation (FIG. 1B) relative to the second member 2. The passive structure 6 is rotated from a first structure orientation (FIG. 1A) to a second structure orientation (FIG. 1B). When the first member 1 is rotated from the second member orientation (FIG. 1B) to the third member orientation (FIG. 1C) relative to the second member 2, the passive structure 6 is not rotated.

Figure 3:
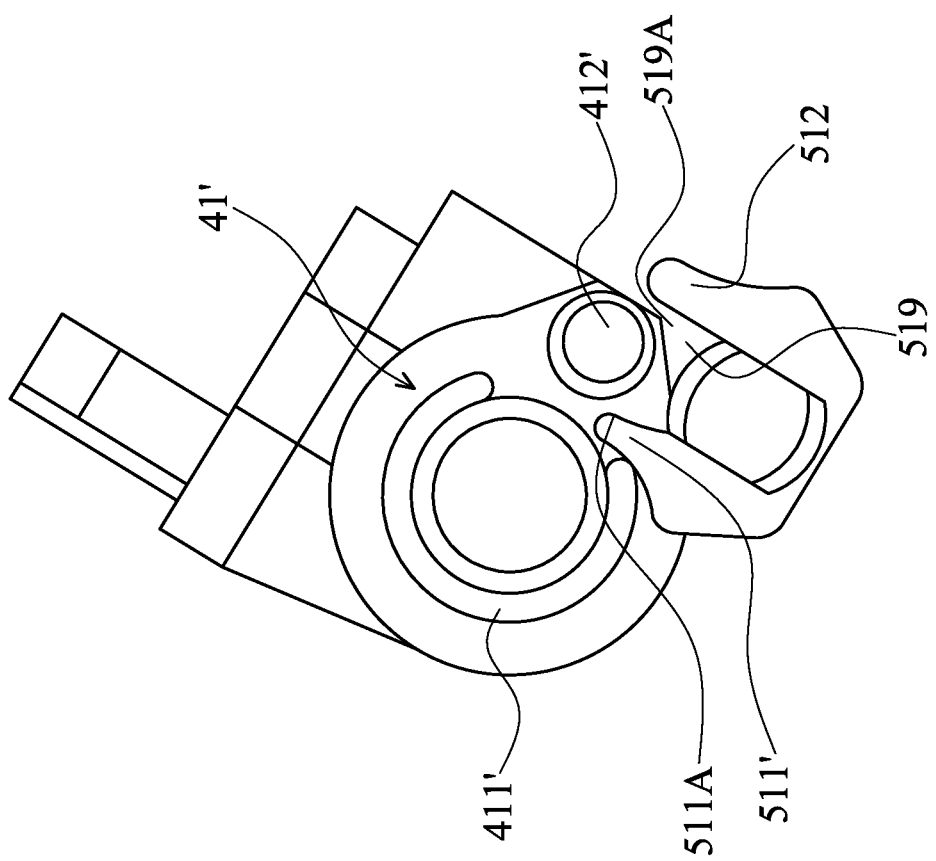
FIG. 3 is a side view of a linked hinge mechanism of a second embodiment of the invention.

FIG. 3 is a side view of a linked hinge mechanism of a second embodiment of the invention. With reference to FIG. 3, in the linked hinge mechanism H2 of the second embodiment of the invention, the length of the second claw 512 is longer than the length of the first claw 511'. In this embodiment, the first claw 511' comprises a chamfered edge 511A. The chamfered edge 511A is formed on an open end 519A of the guiding slot 519. The pushing post 412' of the pushing member 41' is adapted to enter the guiding slot 519 through the open end 519A, and the rim 411' is adapted to abut the first claw 511'. Utilizing the chamfered edge 511A of the embodiment of the invention, the pushing post 412' enters the guiding slot 519 smoothly.

Figure 4A:
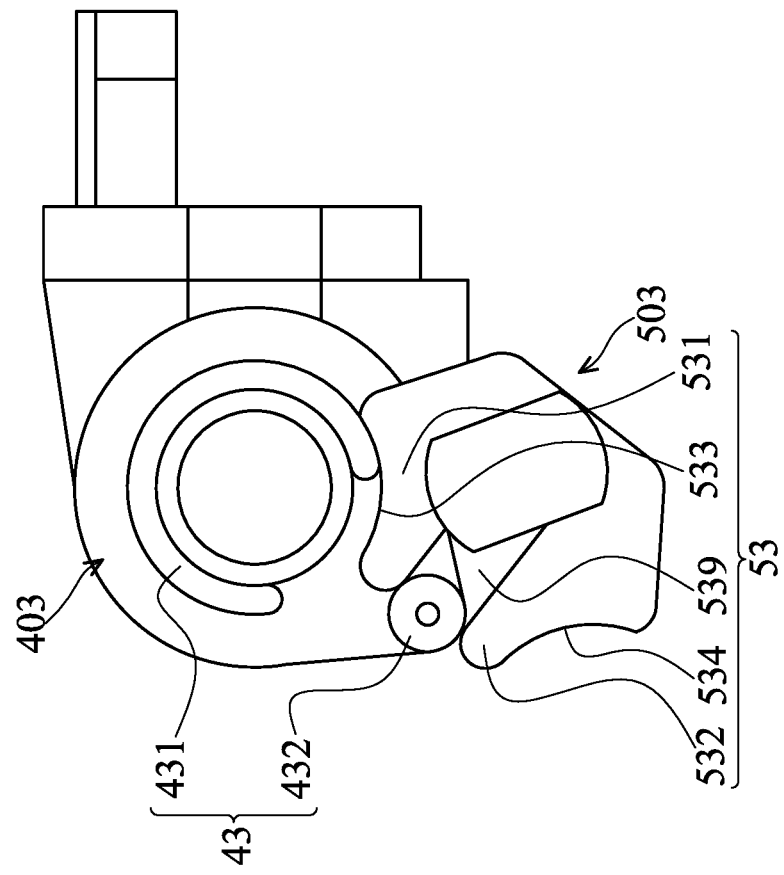
FIG. 4A is a side view of the linked hinge mechanism of the third embodiment of the invention, wherein the first member is in the first member orientation.
Figure 4B:
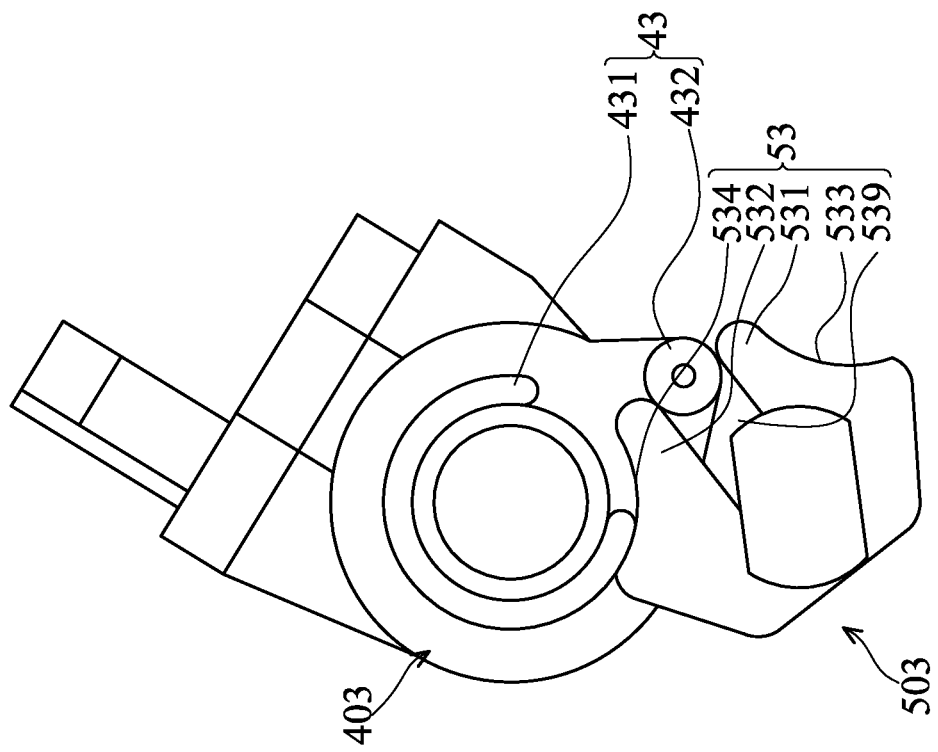
FIG. 4B is a side view of the linked hinge mechanism of the third embodiment of the invention, wherein the first member is in the second member orientation.
Figure 4C:
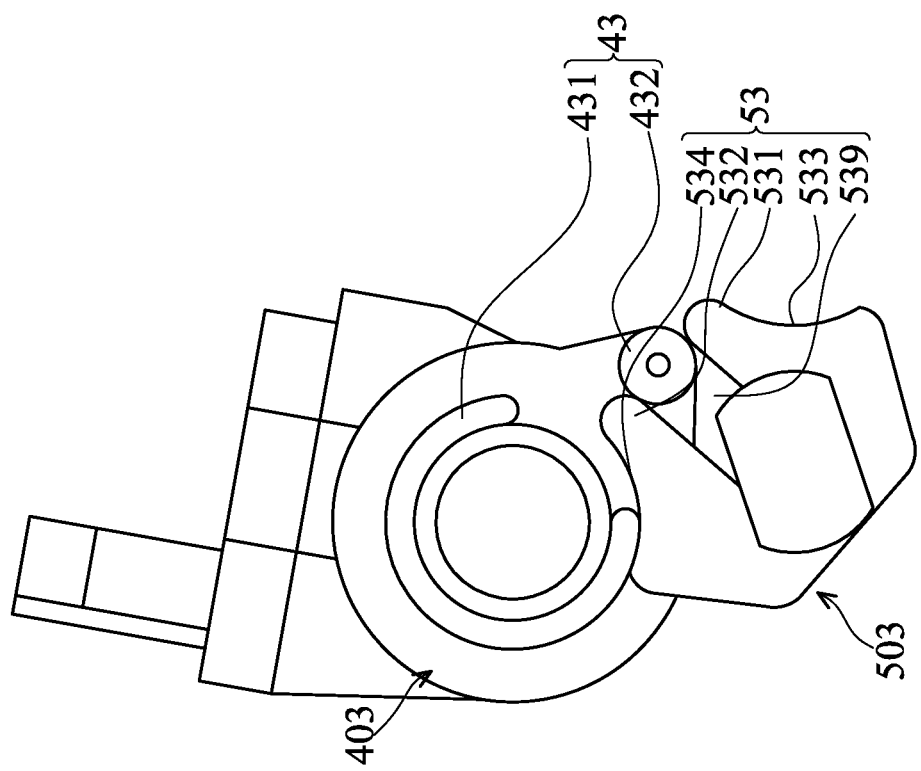
FIG. 4C is a side view of the linked hinge mechanism of the third embodiment of the invention, wherein the first member is in the third member orientation.

FIG. 4A is a side view of the linked hinge mechanism of the third embodiment of the invention, wherein the first member is in the first member orientation. FIG. 4B is a side view of the linked hinge mechanism of the third embodiment of the invention, wherein the first member is in the second member orientation. FIG. 4C is a side view of the linked hinge mechanism of the third embodiment of the invention, wherein the first member is in the third member orientation. With reference to FIGS. 4A, 4B and 4C, in the linked hinged mechanism H3 of the third embodiment, the pushing unit 403 comprises a pushing member 43. The pushing member 43 comprises a rim 431 and a pushing post 432. The passive unit 503 comprises a passive member 53. The passive member 53 comprises a guiding slot 539, a first curved surface 533 and a second curved surface 534. When the first member 1 is in the first member orientation relative (FIG. 4A) to the second member 2, the rim 431 abuts the first curved surface 533, and the pushing post 432 is partially in the guiding slot 539. When the first member 1 is rotated from the first member orientation (FIG. 4A) to the second member orientation (FIG. 4B) relative to the second member 2, the pushing post 432 pushes the inner wall of the guiding slot 539 to rotate the passive member 53.

With reference to FIGS. 4A, 4B and 4C, in one embodiment, when the first member 1 is in the second member orientation relative to the second member 2, the pushing post 432 is adapted to be separated from the guiding slot 539 and the rim 431 abuts the second curved surface 534. When the first member 1 is rotated from the second member orientation to the third member orientation relative to the second member 2, the rim 431 slides along the second curved surface 534, and the passive member 53 is not rotated.

With reference to FIGS. 4A, 4B and 4C, in one embodiment, the passive member 53 comprises a first claw 531 and a second claw 532. The guiding slot 539 is located between the first claw 531 and the second claw 532. The first curved surface 533 is formed on the first claw 531, and the second curved surface 534 is formed on the second claw 532.

Figure 5A:
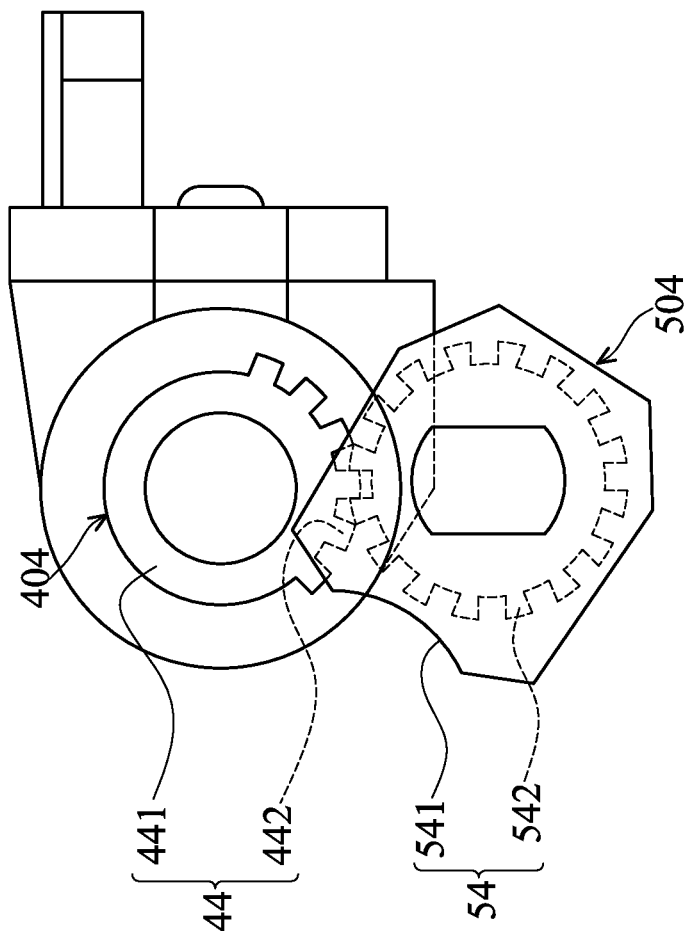
FIG. 5A is a side view of the linked hinge mechanism of the fourth embodiment of the invention, wherein the first member is in the first member orientation.
Figure 5B:
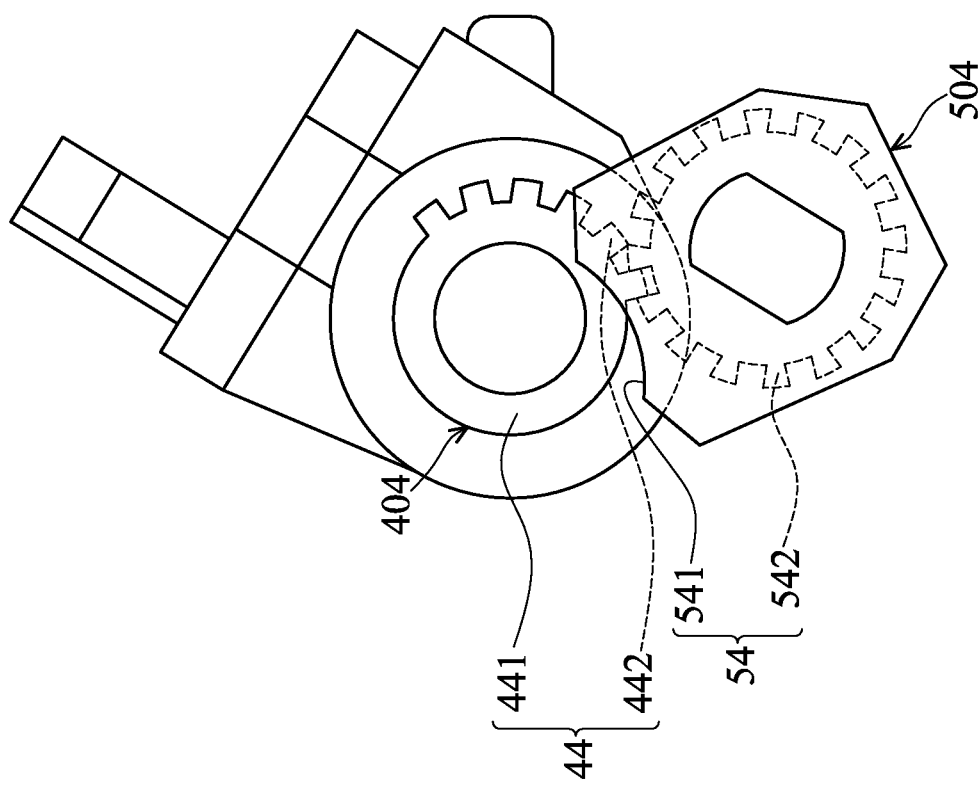
FIG. 5B is a side view of the linked hinge mechanism of the fourth embodiment of the invention, wherein the first member is in the second member orientation.
Figure 5C:
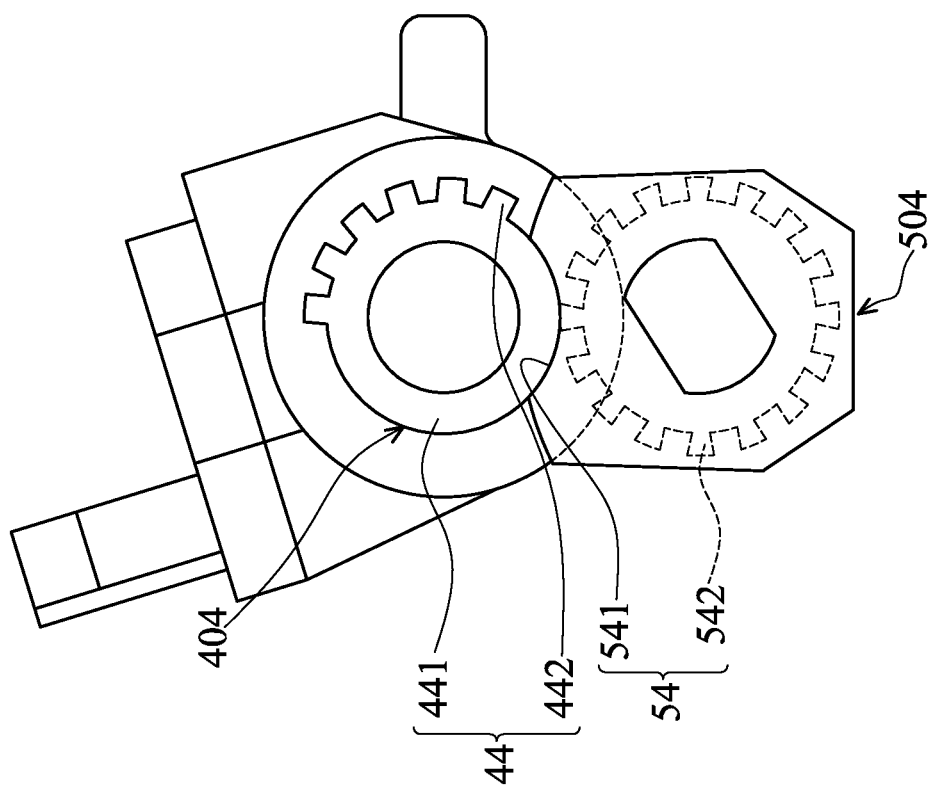
FIG. 5C is a side view of the linked hinge mechanism of the fourth embodiment of the invention, wherein the first member is in the third member orientation.
Figure 5D:
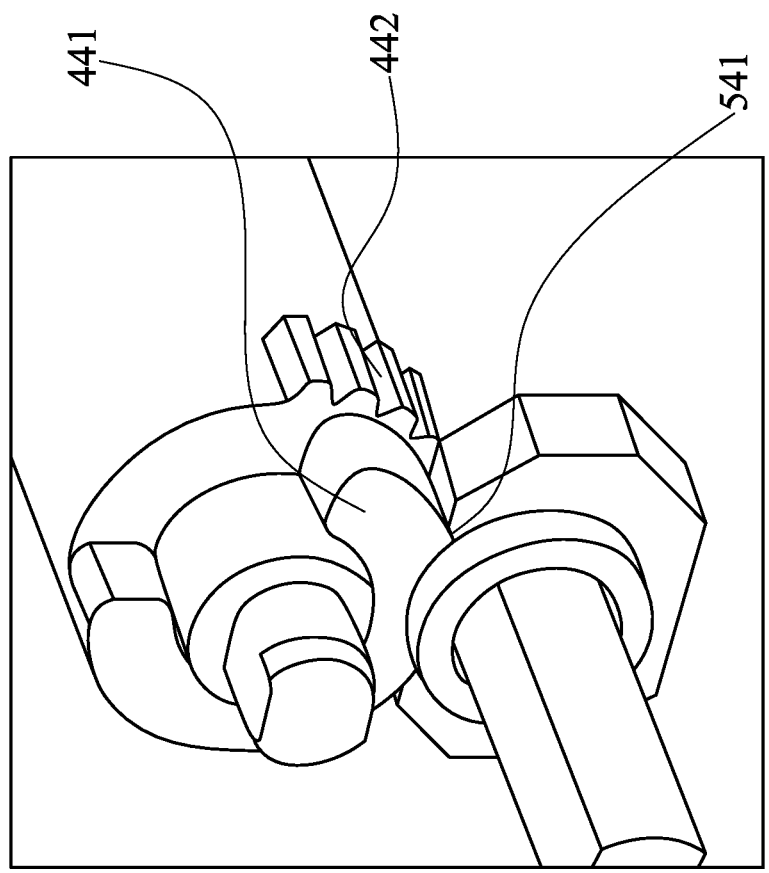
FIG. 5D is a perspective view of the linked hinge mechanism of the fourth embodiment of the invention.
Figure 5E:
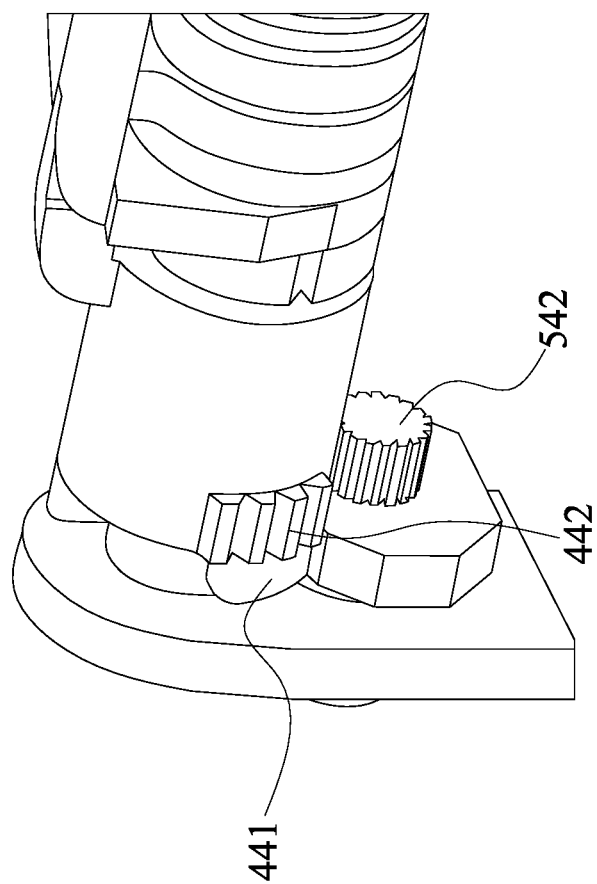
FIG. 5E is another perspective view of the linked hinge mechanism of the fourth embodiment of the invention.

FIG. 5A is a side view of the linked hinge mechanism of the fourth embodiment of the invention, wherein the first member is in the first member orientation. FIG. 5B is a side view of the linked hinge mechanism of the fourth embodiment of the invention, wherein the first member is in the second member orientation. FIG. 5C is a side view of the linked hinge mechanism of the fourth embodiment of the invention, wherein the first member is in the third member orientation. FIG. 5D is a perspective view of the linked hinge mechanism of the fourth embodiment of the invention. FIG. 5E is another perspective view of the linked hinge mechanism of the fourth embodiment of the invention. With reference to FIGS. 5A, 5B, 5C, 5D and 5E, in the linked hinged mechanism of the fourth embodiment, the pushing unit 404 comprises a pushing member 44. The pushing member 44 comprises a rim 441 and a first gear portion 442. The passive unit 504 comprises a passive member 54. The passive member 54 comprises a curved surface 541 and a second gear portion 542. When the first member 1 is in the first member orientation (FIG. 5A) relative to the second member 2, the first gear portion 442 meshes the second gear portion 542. When the first member 1 is rotated from the first member orientation (FIG. 5A) to the second member orientation (FIG. 5B) relative to the second member 2, the first gear portion 442 rotates the second gear portion 542 to rotate the passive member 54.

With reference to FIGS. 5A, 5B, 5C, 5D and 5E, in one embodiment, when the first member 1 is in the second member orientation (FIG. 5B) relative to the second member 2, the first gear portion 442 is adapted to be separated from the second gear portion 542, and the rim 441 abuts the curved surface 541. When the first member 1 is rotated from the second member orientation (FIG. 5B) to the third member orientation (FIG. 5C) relative to the second member 2, the rim 441 slides along the curved surface 541, and the passive member 54 is not rotated.

Figure 6A:
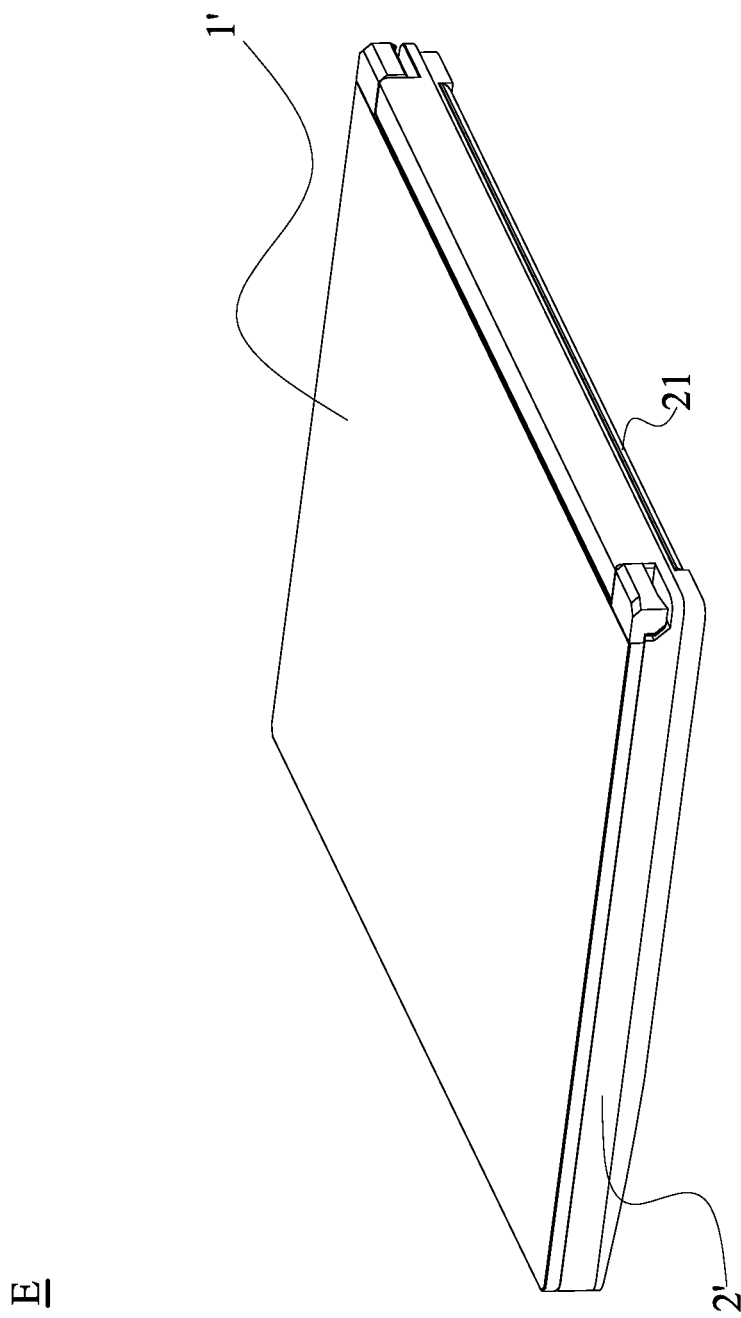
FIG. 6A shows an electronic device of the embodiment of the invention, wherein a cover is in a first cover orientation.
Figure 6B:
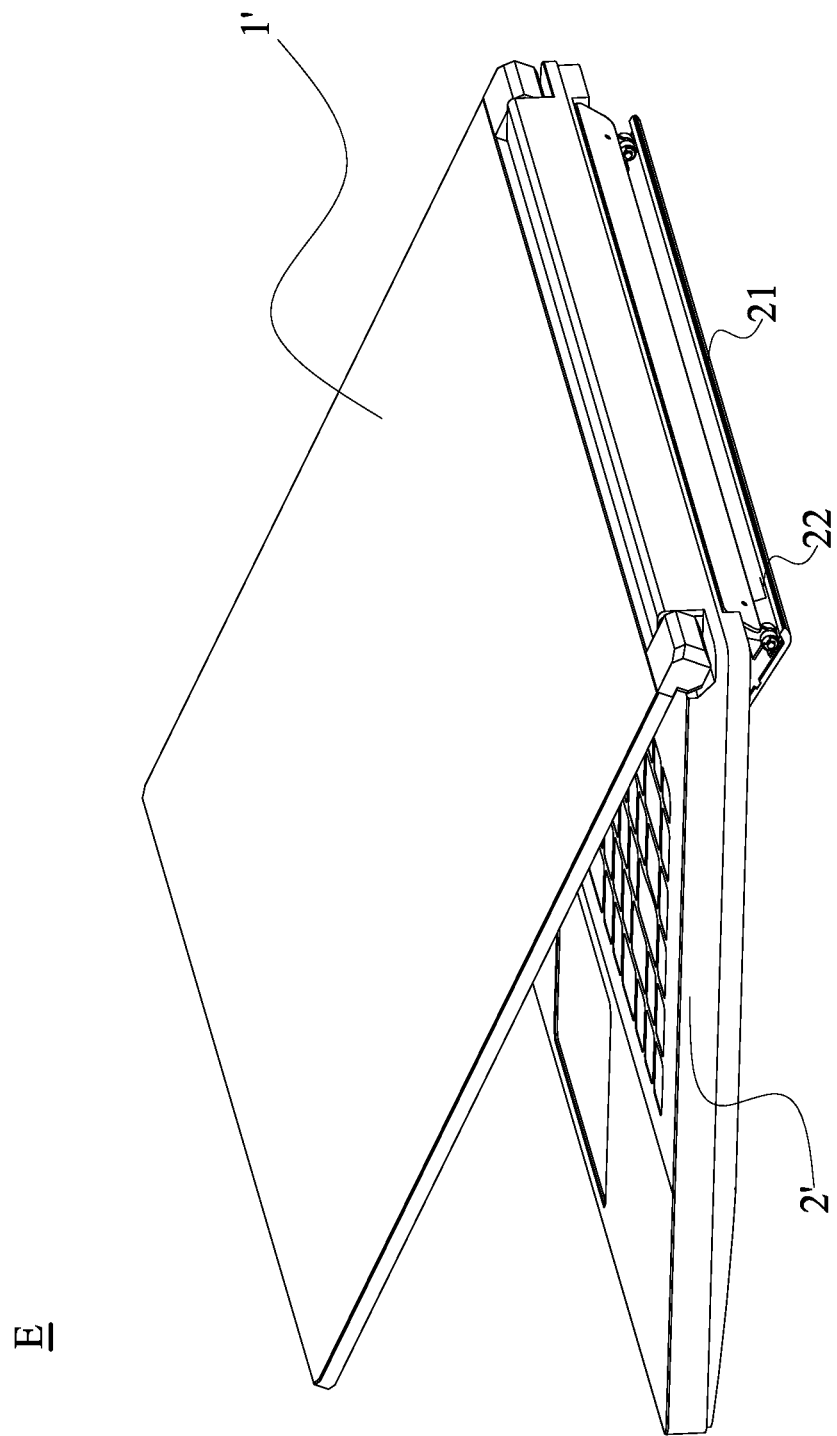
FIG. 6B shows the electronic device of the embodiment of the invention, wherein the cover is in a second cover orientation.
Figure 6C:
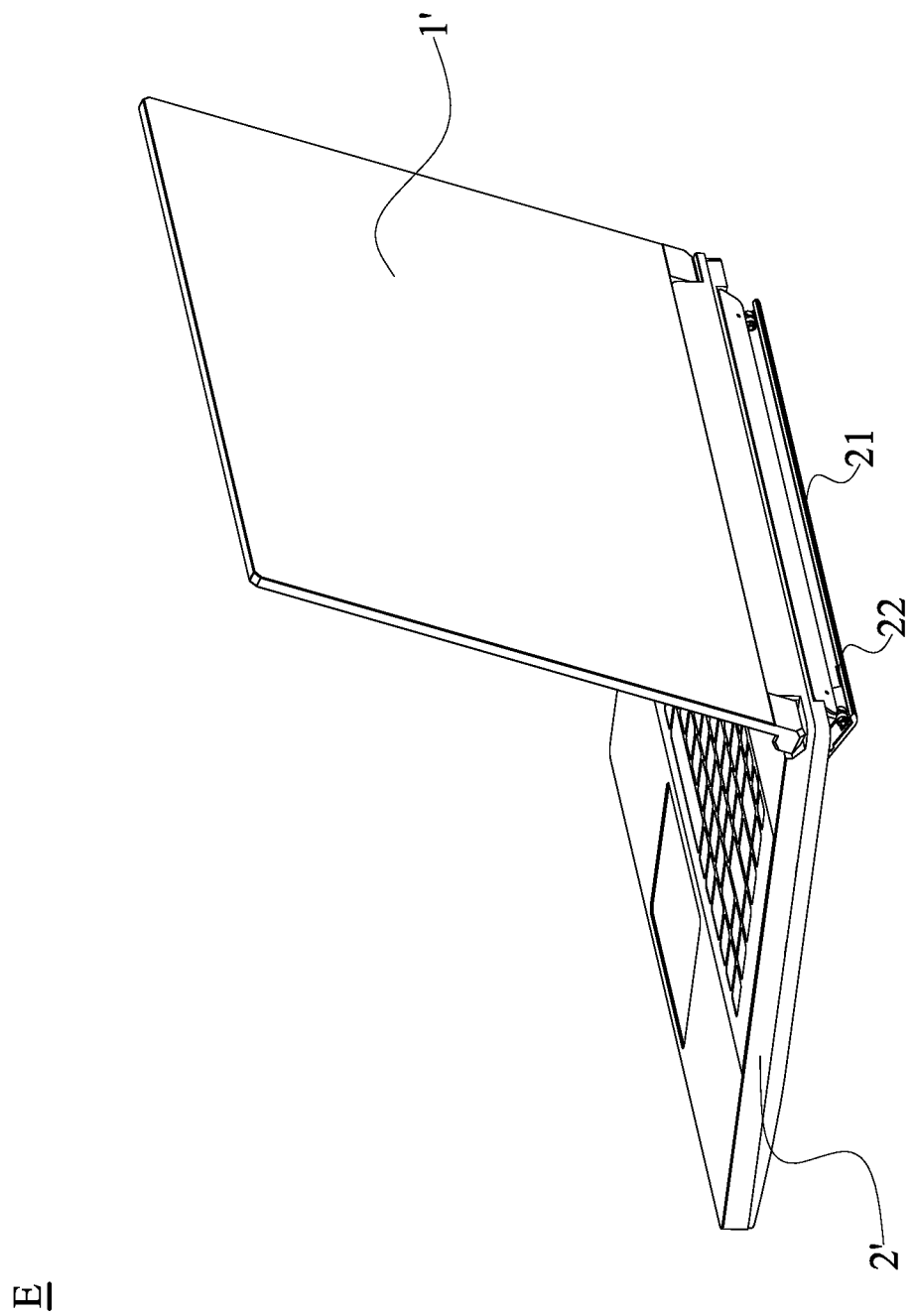
FIG. 6C shows the electronic device of the embodiment of the invention, wherein the cover is in a third cover orientation.

FIG. 6A shows an electronic device of the embodiment of the invention, wherein a cover is in a first cover orientation. FIG. 6B shows the electronic device of the embodiment of the invention, wherein the cover is in a second cover orientation. FIG. 6C shows the electronic device of the embodiment of the invention, wherein the cover is in a third cover orientation. With reference to FIGS. 6A, 6B and 6C, in another embodiment, an electronic device E is provided. The electronic device E includes a cover 1', a device body 2', said hinge unit (not shown), said pushing unit (not shown), said passive unit (not shown) and said passive structure (not shown). The hinge unit is connected to the cover 1' and the device body 2'. The cover 1' is adapted to be rotated relative to the device body 2' via the hinge unit. The passive unit is connected to the hinge unit and is adapted to be rotated by the movement of the hinge unit. The passive unit is adapted to be rotated by the movement of the hinge unit in only a portion of the whole rotation range of the hinge unit. When the cover 1' is rotated from a first cover orientation (FIG. 6A) to a second cover orientation (FIG. 6B) relative to the device body 2', the passive unit is rotated by the pushing unit. The passive structure is affixed to the passive unit. When the cover 1' is rotated from the first cover orientation (FIG. 6A) to the second cover orientation (FIG. 6B) relative to the device body 2', the passive structure 6 is rotated from a first structure orientation (FIG. 6A) to a second structure orientation (FIG. 6B).

With reference to FIGS. 6A, 6B and 6C, in one embodiment, when the cover 1' is rotated from the second cover orientation (FIG. 6B) to the third cover orientation (FIG. 6C) relative to the device body 2', a linkage between the pushing unit and the passive unit is removed, and the passive unit and the passive structure are not rotated.

With reference to FIGS. 6A, 6B and 6C, in one embodiment, the electronic device E further comprises a decoration shield 21. The decoration shield 21 pivots on the device body 2'. The passive structure comprises a pushing rod. When the passive structure is rotated from the first structure orientation to the second structure orientation, the pushing rod pushes the decoration shield 21, and the decoration shield 21 is rotated from a closed orientation (FIG. 6A) to an open orientation (FIG. 6B) relative to the device body 2'.

With reference to FIGS. 6A, 6B and 6C, in one embodiment, the electronic device E further comprises an antenna unit 22. The antenna unit 22 is attached to the inner side of the decoration shield 21. When the decoration shield 21 is in the open orientation (FIG. 6B), the antenna 22 is exposed.

Utilizing the linked hinge mechanism of the embodiment of the invention, when the first member is rotated relative to the second member via the hinge unit, the passive unit is rotated by the movement of the hinge unit. When the first member is rotated from the second member orientation to the third member orientation relative to the second member, the passive unit is not rotated to provide the intermittent rotation effect.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term).

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A linked hinge mechanism, comprising:
a first member;
a second member;
a hinge unit, connected to the first member and the second member, wherein the first member is rotated relative to the second member via the hinge unit;
a passive unit, moved by the movement of the hinge unit, wherein the passive unit is driven by the hinge unit selectively.

2. The linked hinge mechanism as claimed in claim 1, further comprising a pushing unit, wherein the pushing unit is connected to the hinge unit and is adapted to be rotated with the hinge unit, the passive unit is adapted to be connected to the pushing unit, and when the first member is rotated from a first member orientation to a second member orientation relative to the second member, the passive unit is rotated by the movement of the pushing unit.

3. The linked hinge mechanism as claimed in claim 2, wherein when the first member is rotated from the second member orientation to a third member orientation relative to the second member, a linkage between the pushing unit and the passive unit is removed, and the passive unit is not rotated.

4. The linked hinge mechanism as claimed in claim 3, wherein the pushing unit comprises a pushing member, wherein the pushing member comprises a rim and a pushing post, the passive unit comprises a passive member, the passive member comprises a guiding slot and a first curved surface, and when the first member is in the first member orientation relative to the second member, the pushing post is in the guiding slot, and when the first member is rotated from the first member orientation to the second member orientation relative to the second member, the pushing post pushes an inner wall of the guiding slot to rotate the passive member.

5. The linked hinge mechanism as claimed in claim 4, wherein when the first member is in the second member orientation relative to the second member, the pushing post is adapted to be separated from the guiding slot and the rim abuts the first curved surface, and when the first member is rotated from the second member orientation to the third member orientation relative to the second member, the rim slides along the first curved surface, and the passive member is not rotated.

6. The linked hinge mechanism as claimed in claim 5, wherein the passive member comprises a first claw and a second claw, the guiding slot is located between the first claw and the second claw, and the first curved surface is formed on the first claw.

7. The linked hinge mechanism as claimed in claim 6, wherein the first claw comprises a chamfered edge, and the chamfered edge is formed on an open end of the guiding slot.

8. The linked hinge mechanism as claimed in claim 6, wherein a length of the second claw is greater than or equal to a length of the first claw.

9. The linked hinge mechanism as claimed in claim 3, wherein the pushing unit comprises a pushing member, wherein the pushing member comprises a rim and a pushing post, the passive unit comprises a passive member, the passive member comprises a guiding slot, a first curved surface and a second curved surface, and when the first member is in the first member orientation relative to the second member, the rim abuts the first curved surface, and when the first member is rotated from the first member orientation to the second member orientation relative to the second member, the pushing post pushes the inner wall of the guiding slot to rotate the passive member.

10. The linked hinge mechanism as claimed in claim 9, wherein when the first member is in the second member orientation relative to the second member, the pushing post is adapted to be separated from the guiding slot and the rim abuts the second curved surface, and when the first member is rotated from the second member orientation to the third member orientation relative to the second member, the rim slides along the second curved surface, and the passive member is not rotated.

11. The linked hinge mechanism as claimed in claim 10, wherein the passive member comprises a first claw and a second claw, the guiding slot is located between the first claw and the second claw, the first curved surface is formed on the first claw, and the second curved surface is formed on the second claw.

12. The linked hinge mechanism as claimed in claim 3, wherein the pushing unit comprises a pushing member, wherein the pushing member comprises a rim and a first gear portion, the passive unit comprises a passive member, the passive member comprises a curved surface and a second gear portion, and when the first member is in the first member orientation relative to the second member, the first gear portion meshes the second gear portion, and when the first member is rotated from the first member orientation to the second member orientation relative to the second member, the first gear portion rotates the second gear portion to rotate the passive member.

13. The linked hinge mechanism as claimed in claim 12, wherein when the first member is in the second member orientation relative to the second member, the first gear portion is adapted to be separated from the second gear portion, and the rim abuts the curved surface, and when the first member is rotated from the second member orientation to the third member orientation relative to the second member, the rim slides along the curved surface, and the passive member is not rotated.

14. The linked hinge mechanism as claimed in claim 3, further comprising a passive structure, the passive structure is affixed to the passive unit, and when the first member is rotated from the first member orientation to the second member orientation relative to the second member, the passive structure is rotated from a first structure orientation to a second structure orientation, and when the first member is rotated from the second member orientation to the third member orientation relative to the second member, the passive structure is not rotated.

15. An electronic device, comprising: a first member comprising a cover; a second member comprising a device body; a hinge unit, connected to the first member and the second member, wherein the first member is rotated relative to the second member via the hinge unit; and a passive unit, moved by the movement of the hinge unit, wherein the passive unit is driven by the hinge unit selectively.

16. The electronic device as claimed in claim 15, further comprising a passive structure, wherein the passive structure is affixed to the passive unit, when the cover is rotated from a second cover orientation to a third cover orientation relative to the device body, a linkage between the pushing unit and the passive unit is removed, and the passive unit and the passive structure are not rotated.

17. The electronic device as claimed in claim 16, further comprising a decoration shield, wherein the decoration shield pivots on the device body, the passive structure comprises a pushing rod, and when the passive structure is rotated from the first structure orientation to the second structure orientation, the pushing rod pushes the decoration shield, and the decoration shield is rotated from a closed orientation to an open orientation relative to the device body.

18. The electronic device as claimed in claim 17, further comprising an antenna unit, wherein the antenna unit is attached to an inner side of the decoration shield, and when the decoration shield is in the open orientation, the antenna is exposed.

19. A linked hinge mechanism, comprising:
a first member;
a second member;
a hinge unit, connected to the first member and the second member, wherein the first member is rotated relative to the second member via the hinge unit;
a passive unit, moved by the movement of the hinge unit, wherein in a first state, the passive unit is moved with the hinge unit synchronously, and in a second state, the hinge unit is separated from the passive unit and is rotated independently.

* * * * *